US010059191B2

(12) United States Patent
Wright (10) Patent No.: US 10,059,191 B2
(45) Date of Patent: Aug. 28, 2018

(54) LOW RESISTANCE FLOW REGULATOR (71) Applicants: DENSO International America, Inc., Southfield, MI (US); DENSO CORPORATION, Kariya-shi, Aichi-ken (JP)

(72) Inventor: Jacob Wright, Royal Oak, MI (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 726 days.

(21) Appl. No.: 14/321,207

(22) Filed: Jul. 1, 2014

(65) Prior Publication Data

US 2016/0001650 A1 Jan. 7, 2016

(51) Int. Cl.
| | |
|---|---|
| B60K 11/02 | (2006.01) |
| G05D 7/06 | (2006.01) |
| G05D 7/01 | (2006.01) |
| F01P 7/14 | (2006.01) |
| F16K 1/22 | (2006.01) |
| F16K 15/02 | (2006.01) |
| F16K 17/08 | (2006.01) |
| F16K 31/00 | (2006.01) |
| F01P 3/00 | (2006.01) |
| F01P 5/12 | (2006.01) |
| F01P 7/16 | (2006.01) |

(52) U.S. Cl.
CPC .............. B60K 11/02 (2013.01); F01P 7/14 (2013.01); F16K 1/221 (2013.01); F16K 1/222 (2013.01); F16K 15/028 (2013.01); F16K 17/08 (2013.01); F16K 31/002 (2013.01); G05D 7/0173 (2013.01); F01P 3/00 (2013.01); F01P 5/12 (2013.01); F01P 7/16 (2013.01); F01P 2007/146 (2013.01)

(58) Field of Classification Search
CPC .......... B06K 11/02; F01P 3/00; G05D 7/0173
USPC ...................................... 165/51, 200; 138/46
See application file for complete search history.

(56) References Cited

U.S. PATENT DOCUMENTS

| | | | |
|---|---|---|---|
| 2,445,684 A * | 7/1948 | Mallory | F01P 7/167 |
| | | | 123/41.08 |
| 3,452,762 A * | 7/1969 | Fahre | F16K 17/34 |
| | | | 137/499 |
| 4,073,465 A * | 2/1978 | Sheppard | F16K 31/1655 |
| | | | 251/58 |
| 4,989,456 A | 2/1991 | Stupecky | |

(Continued)

Primary Examiner — Jianying Atkisson
Assistant Examiner — Joel Attey
(74) Attorney, Agent, or Firm — Harness, Dickey & Pierce, P.L.C.

(57) ABSTRACT

The present teachings provide for a flow restrictor for a coolant line of an internal combustion engine coolant system. The flow restrictor can include a restrictor element and a biasing member. The restrictor element can include a restrictor plate and a tab non-rotatably coupled at an angle. The biasing member can rotationally bias the restricting element to a first position where the restricting plate is substantially parallel to the flow of fluid. The tab can be configured to create a torque on the restricting element to overcome the biasing member and rotate the restricting plate to block a portion of the fluid flow path when the flow exceeds a predetermined flow rate.

17 Claims, 4 Drawing Sheets

(56) References Cited

U.S. PATENT DOCUMENTS

| | | | | |
|---|---|---|---|---|
| 5,709,241 A | * | 1/1998 | Iwata | F01N 1/02 137/527 |
| 2012/0180875 A1 | | 7/2012 | Keller et al. | |
| 2012/0264028 A1 | * | 10/2012 | Skala | F16K 1/222 429/444 |
| 2013/0008529 A1 | | 1/2013 | Becker et al. | |
| 2015/0094893 A1 | * | 4/2015 | Hopkirk | F02D 29/02 701/22 |

\* cited by examiner

LOW RESISTANCE FLOW REGULATOR

FIELD

The present disclosure relates to low resistance flow regulators, such as, low resistance flow regulators for regulating flow of engine coolant.

BACKGROUND

This section provides background information related to the present disclosure, which is not necessarily prior art.

Internal combustion engines, such as gasoline or diesel engines, for example, often have a coolant system to remove heat from the engine that would otherwise have detrimental effects on fuel economy, engine performance, and longevity. Typical coolant systems include at least a pump, a heat exchanger, such as a radiator for example, coolant fluid, and various tubes, hoses, or passages to convey the fluid between the engine and the heat exchanger. Coolant systems can also include a thermostat, which typically blocks coolant flow through the system until the engine warms up to a predetermined operating temperature, and then allows full flow thereafter. The fluid can be pumped through passages in the engine to absorb heat generated by combustion. The heated fluid can then pass through the heat exchanger to release the heat, typically to the atmosphere.

The flow rate of the fluid through the system can be important to ensure optimal cooling of the engine. In order to vary flow rate of the fluid, coolant pumps are typically rotationally driven by a belt connected to a pulley mounted to the engine crankshaft. In this way, the pump speed, and therefore the fluid flow rate, is proportional to the engine speed, i.e. revolutions per minute (RPM). As the engine RPMs increase, the coolant flow rate increases. In some situations, this configuration is preferable in order to roughly correspond cooling capacity with heat production from the engine. However, it has been found that certain high RPM conditions can produce flow rates that exceed the necessary cooling capacity, and/or can be detrimental to various components of the cooling system. Specifically, higher flow rates can lead to increased erosion of the internal passages of the heat exchanger, which can shorten the lifespan of the heat exchanger. The desirable flow rate ranges can vary with application and equipment, but for example some coolant systems have been found to produce flow rates in excess of 450 liters per minute in certain high RPM conditions, while only requiring flow rates in the order of 220 liters per minute.

Prior solutions to regulate coolant flow have typically been complex, costly, or resulted in restricted flow at lower flow rates. For example, some coolant systems use complex valves, other systems use devices that restrict flow at all flow rates, or become closed to flow when certain flow or pressure conditions are exceeded. Other systems are known to decouple the pump operation from the engine speed by utilizing an electrically driven pump. Flow rates of these electric pumps can be controlled based on temperature and flow rate sensors. However, the cost and complexity of such systems can be undesirable. Accordingly, a need exists for an improved internal combustion engine coolant system having low resistance during low RPM conditions, while regulating flow during high RPM conditions.

SUMMARY

This section provides a general summary of the disclosure, and is not a comprehensive disclosure of its full scope or all of its features.

The present teachings provide for a flow restrictor for a coolant line of an internal combustion engine coolant system. The flow restrictor can include a restrictor element and a biasing member. The restrictor element can be configured for rotation about a pivot axis within a flow path of the coolant line. The restrictor element can include a first restrictor plate and a tab. The first restrictor plate can extend in a first direction. The tab can extend in a second direction different than the first direction. The biasing member can be configured to generate a first torque about the pivot axis to bias the restrictor element toward a first rotational position. In the first rotational position, the first restrictor plate can be substantially parallel to a central axis of the flow path. A second torque about the pivot axis is generated when a fluid flows through the flow path and contacts the tab. The second torque can be opposite the first torque and can exceed the first torque to rotate the restrictor element to a second rotational position when the fluid flows through the flow path at a flowrate greater than a first predetermined flowrate. The first restrictor plate can be configured to block a portion of the flow path to limit the fluid to a second predetermined flowrate.

The present teachings further provide for a coolant system for an internal combustion engine. The coolant system can include a coolant conduit, a flow restrictor, and a biasing member. The coolant conduit can define a flow passageway configured to circulate a coolant fluid through the coolant conduit. The flow restrictor can be disposed within the flow passageway and can include a pivot member, a first restrictor plate, and a tab. The pivot member can be rotatably coupled to the coolant conduit and configured to rotate about a pivot axis. The first restrictor plate can be fixedly coupled to the pivot member and can extend radially therefrom. The tab can be fixedly coupled to the pivot member and can extend radially therefrom at an angle relative to the first restrictor plate. The biasing member can be configured to bias the pivot member toward a first rotational position. A torque about the pivot axis is generated when the coolant fluid flows through the flow passageway and contacts the tab. When the coolant fluid flows through the flow passageway at a flowrate greater than a predetermined flowrate the torque can overcome the biasing member to rotate the pivot member to a second rotational position. When in the first rotational position, a first area of the flow passageway can be restricted by the tab. When in the second rotational position, a second area of the flow passageway can be restricted by the restrictor plate. The second area can be greater than the first area.

The present teachings further provide for a coolant system for an internal combustion engine. The coolant system can include a heat exchanger, a coolant circuit, a flow restrictor, and a biasing member. The heat exchanger can include an inlet port and an outlet port. The coolant circuit can include a supply conduit and a return conduit. The supply conduit can be coupled for fluid communication with the inlet port and can define a supply passageway configured to convey a coolant fluid from the engine to the heat exchanger. The return conduit can be coupled for fluid communication with the outlet port and can define a return passageway configured to convey the coolant fluid from the heat exchanger to the engine. The flow restrictor can be disposed within one of the supply passageway or the return passageway. The flow restrictor can include a pivot member, a first restrictor plate, and a tab. The pivot member can be rotatably coupled to the one of the supply conduit or the return conduit that the flow restrictor is disposed within and can be configured to rotate about a pivot axis. The first restrictor plate can be fixedly coupled to the pivot member and can extend radially therefrom in a first direction. The tab can be fixedly coupled to the pivot member and can extend radially therefrom in a second direction different than the first direction. The biasing member can be configured to bias the pivot member toward a first rotational position. In the first rotational position, the first restrictor plate can be substantially parallel to a central axis of the one the supply passageway or the return passageway. A torque about the pivot axis is generated when a fluid flows through the one of the supply passageway and the return passageway and contacts the tab. When the coolant fluid flows through the coolant circuit at a flowrate greater than a predetermined flowrate the torque can overcome the biasing member to rotate the pivot member to a second rotational position. When in the first rotational position, a first area of the one of the supply passageway or the return passageway can be restricted by the tab. When in the second rotational position, a second area of the one of the supply passageway or the return passageway can be restricted by the restrictor plate. The second area can be greater than the first area.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
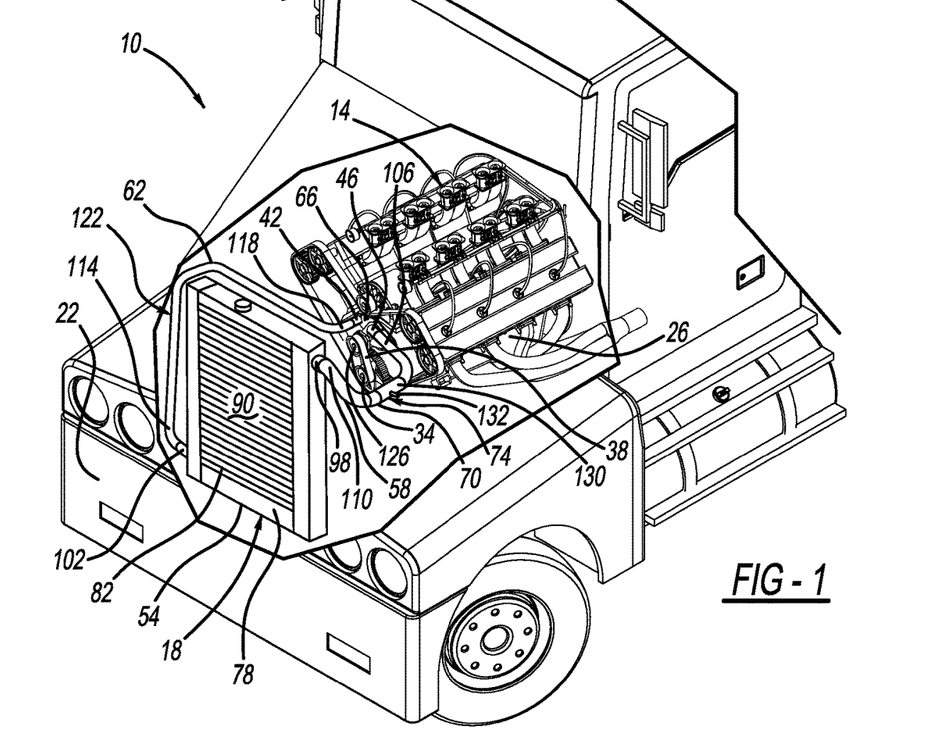
FIG. 1 is an exemplary vehicle having an internal combustion engine and a coolant system with a flow restrictor in accordance with the present teachings.

With reference to FIG. 1, a vehicle 10 is illustrated as having an internal combustion engine 14 and a coolant system 18. In the example provided the vehicle 10 is illustrated as a truck, however, it is understood that the vehicle 10 can be any type of vehicle having an internal combustion engine, such as a passenger car, bus, recreational vehicle, military vehicle, aircraft, or watercraft for example. It is also understood that the coolant system 18 may be used with an internal combustion engine not disposed in a vehicle, such as a generator, agricultural machinery, industrial machinery, construction equipment, or military equipment for example. In the example provided, the coolant system 18 is located at a front portion 22 of the vehicle 10, although other configurations or locations can be used.

The engine 14 can include an engine block 26, a crankshaft (not shown), a drive pulley 34, and a belt 38, for example. It is understood that the engine 14 can be any type of internal combustion engine, such as a piston-cylinder engine or a rotary engine, for example. The engine block 26 can define an engine inlet 42, an engine outlet 46, and at least one engine passage (not shown) extending through a portion of the engine block 26. It is understood that the engine passage can pass through other portions of the engine 14 as well, such as a cylinder head of a piston-cylinder engine for example. The engine passage can be in fluid communication with the engine inlet 42 and the engine outlet 46 to allow a coolant fluid (not shown) to flow through the engine block 26 and absorb heat from the engine 14.

The crankshaft can be rotatably mounted within the engine block 26 and configured to be coupled to a prime mover element (not shown) within the engine block 26. The prime mover element can be any type of prime mover element configured to translate combustion energy into rotation of the crankshaft, such as a piston of a piston-cylinder engine, or a rotor of a rotary engine for example. The drive pulley 34 can be non-rotatably coupled to the crankshaft to rotate therewith. The drive pulley 34 can be coupled to the belt 38 to rotatably drive the belt 38.

The coolant system 18 can include a heat exchanger 54, a supply conduit 58, a return conduit 62, a pump 66, and a flow restrictor 70. The coolant system 18 can further include a thermostat 74. The heat exchanger 54 can be any type of heat exchanger, such as a radiator, or a parallel plate heat exchanger for example, for example.

In the example provided, the heat exchanger 54 is a radiator having a radiator body 78, a plurality of tubes 82, a plurality of fins (not shown). The radiator body 78 can have a first face 90 and a second face (not shown) opposite to the first face 90, and can define a radiator inlet 98 and a radiator outlet 102. In the example provided, the radiator body 78 is generally rectangular in shape, although other configurations can be used.

The tubes 82 can extend through the radiator body 78 and be configured to allow the coolant fluid to flow through the tubes 82. The radiator inlet 98 and radiator outlet 102 can be in fluid communication with opposite ends of the tubes 82 to allow the coolant fluid to pass from the radiator inlet 98, through the tubes 82, and to the radiator outlet 102. The tubes 82 can be arranged in the radiator body 78 such that air can flow through the first face 90 and pass over the tubes 82 before exiting the radiator body 78 through the second face.

The air passing over and between the tubes 82 can absorb heat from the coolant fluid to dissipate the heat to the atmosphere. The coolant fluid can be any type of coolant liquid such as anti-freeze, or water for example. In the example provided, the tubes 82 are parallel and horizontally oriented with regard to the radiator body 78, although other configurations can be used, such as vertical tubes or serpentine tubes, for example. The fins can extend between the tubes 82 to assist in the dissipation of heat from the coolant fluid as it passes through the tubes 82. In the example provided, the heat exchanger 54 dissipates heat to the atmosphere, although other configurations can be used, such as dissipating heat to inside a passenger compartment of the vehicle 10, or to a secondary coolant system (not shown) via a second coolant fluid (not shown), for example. While the natural airflow passing through the radiator body 78, between the fins and tubes 82, can carry heat away from the heat exchanger 54, a fan (not shown) can be used to force air through the radiator body 78. In the example provided, the heat exchanger 54 is located toward the front 22 of the vehicle 10, although other locations can be used.

The supply conduit 58 can have a first end 106 and a second end 110. The first end 106 can be proximate to the engine 14 and coupled for fluid communication with the engine outlet 46. The second end 110 can be proximate to the heat exchanger 54 and coupled for fluid communication with the radiator inlet 98. The return conduit 62 can have a third end 114 and a fourth end 118. The third end 114 can be proximate to the heat exchanger 54 and coupled for fluid communication with the radiator outlet 102. The fourth end 118 can be proximate to the engine 14 and coupled for fluid communication with the engine inlet 42. Thus the supply conduit 58 and return conduit 62 can form a coolant circuit 122 for circulating the coolant fluid from the engine 14, through the supply conduit 58, to the heat exchanger 54, and back to the engine 14 through the return conduit 62. It is understood that some of the coolant fluid can be diverted to, and returned from, other components not shown, such as a heater core for a heating, ventilation, and air conditioning (HVAC) system for example.

The pump 66 can be any type of pump for pumping the coolant fluid through the coolant circuit 122, such as an impeller pump for example. The pump 66 can be inline with the coolant circuit 122 and configured to circulate the coolant fluid through the supply conduit 58, the return conduit 62, the engine 14, and the heat exchanger 54. The pump 66 can be mounted to the engine 14 and drivingly coupled to the engine 14. The pump 66 can have a pump pulley 126 that can be coupled to the belt 38 to be rotatably driven by the crankshaft by way of rotation of the belt 38. Rotation of the pump pulley 126 can cause the pump 66 to circulate the coolant fluid within the coolant circuit 122. In the example provided, the pump 66 is inline with the return conduit 62, between the fourth end 118 and the engine inlet 42, but other locations along the coolant circuit 122 can be used, such as inline with the supply conduit 58 for example.

The thermostat 74 can have a thermostat body 130, a valve (not shown) and a sensing element (not shown). The thermostat body 130 can be inline with the coolant circuit 122 at any location within the coolant circuit 122 to prevent flow of the coolant fluid through the coolant circuit 122, as will be described below. In the example provided, the thermostat body 130 is inline with the supply conduit 58, between the first end 106 and second end 110, though other configurations can be used, such as between the engine outlet 46 and first end 106, mounted to the radiator inlet 98 or radiator outlet 102, inline with the return conduit 62, between the fourth end 118 and the engine inlet 42, or inline with the engine passage, for example.

The valve can be disposed in the thermostat body 130 and can be configured move between a closed position and an open position. In the closed position, the valve blocks flow of the coolant fluid through the thermostat body 130, to prevent flow through the heat exchanger 54. In the open position, the valve allows flow of the coolant fluid through the thermostat body 130 to allow flow through the heat exchanger 54. The sensing element can be configured to move the valve between the open and closed positions. The sensing element and valve can be configured such that the valve is in the closed position when the temperature of the coolant fluid is below a predetermined temperature. The sensing element and valve can be configured such that the valve is in the open position when the temperature of the coolant fluid is at or above the predetermined temperature. The predetermined temperature can correspond to a minimum recommended operating temperature of the engine 14. In this way, the thermostat 74 prevents the coolant system 18 from removing heat from the engine 14 until the engine 14 reaches a desired minimum operating temperature.

The thermostat 74 can be operated mechanically, such that the sensing element can physically change states, or position, based to the temperature of the coolant fluid, causing the valve to be opened or closed, as is known in the art. For example, the sensing element can include a substance (not shown), typically a wax, within the thermostat 74 that can melt at the predetermined temperature, which can cause the valve to open. When the temperature of the coolant fluid drops below the predetermined temperature, the substance can reconstitute back to its original form to cause the valve to close. The thermostat 74 can be configured to generally be either fully open or fully closed. The thermostat can alternatively be operated by an electro-mechanical actuator (not shown), and the sensing element can be configured to send an electrical signal to the electro-mechanical actuator to move the valve between the open and closed positions based on the temperature of the coolant fluid relative to the predetermined temperature. Thermostats are generally either fully open or fully closed, and operate based on temperature, not based on flow rate.

The flow restrictor 70 can be inline with the coolant circuit 122. In the example provided, the flow restrictor 70 is inline with the supply conduit 58, between the first end 106 and the second end 110, although other configurations can be used. For example, the flow restrictor 70 can be inline with the return conduit, or mounted to the radiator inlet 98, or radiator outlet 102 for example. The flow restrictor 70 can also be mounted to, or integrally formed with the thermostat body 130.

Figure 2:
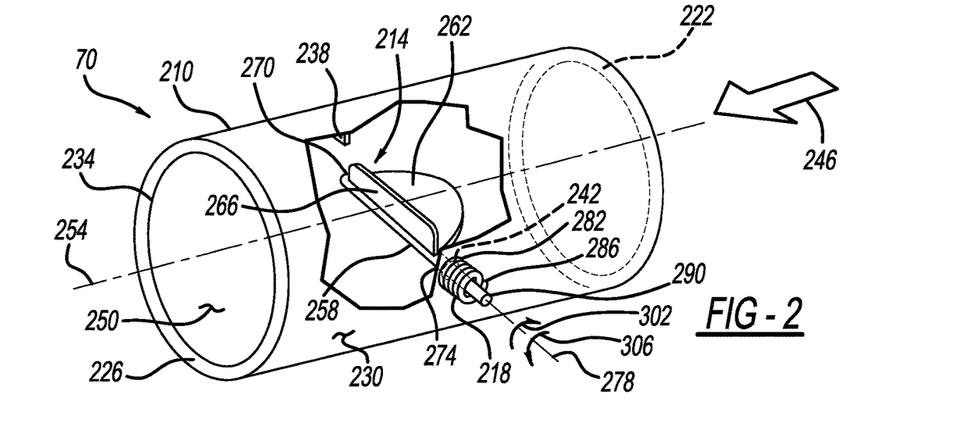
FIG. 2 is a perspective view of the flow restrictor of FIG. 1.
Figure 3:
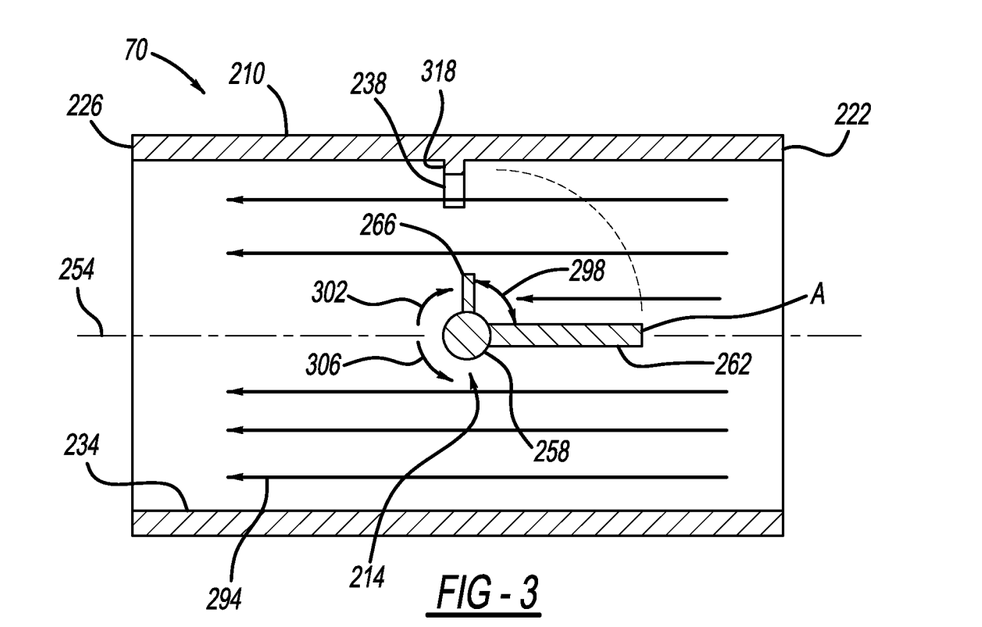
FIG. 3 is a section view of the flow restrictor of FIG. 1 in a first position.
Figure 4:
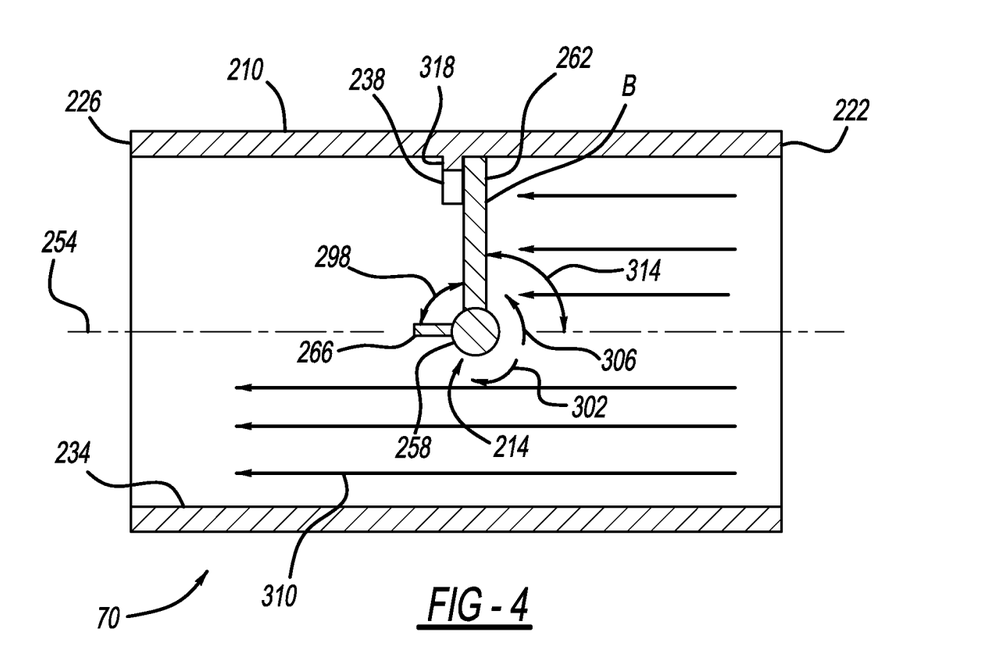
FIG. 4 is a section view of the flow restrictor of FIG. 3 in a second position.

With reference to FIGS. 2-4, the flow restrictor 70 can have a main body 210, a restricting element 214, and a biasing member 218. The main body 210 can have an upstream end 222 and a downstream end 226, an exterior 230, and can be generally hollow to define a flow path 234 between the upstream end 222 and downstream end 226. The main body 210 can also have a stop element 238 and can define a pivot aperture 242 that can extend through the main body 210 between an inner surface 250 and the exterior 230.

The main body 210 can be configured to allow the coolant fluid to flow in a flow direction 246 through flow path 234. The flow path 234 can be a generally cylindrical shape defined by the inner surface 250 and having a central axis 254 parallel to the flow direction 246. While the flow path 234 of the present example is generally cylindrical, other configurations may be used.

The restricting element 214 can include a pivot rod 258, a restricting plate 262, and a tab 266. The pivot rod 258 can extend between opposite sides 270, 274 of the flow path 234 (or opposing portions of the inner surface 250), and can be perpendicular to the central axis 254. The pivot rod 258 can be centered in the main body 210 such that the pivot rod 258 intersects the central axis 254. The pivot rod 258 can be pivotally mounted to the main body 210 for rotation within the flow path 234 about a pivot axis 278. The pivot axis 278 can be perpendicular to the central axis 254 and can intersect the central axis 254.

The biasing member 218 can rotationally bias the restricting element 214 toward a first rotational position A, shown in FIG. 3. The biasing member 218 can be a torsional spring having a first end 282 coupled to the main body 210 and a second end 286 coupled to the pivot rod 258. The pivot aperture 242 can extend through one of the sides 270, 274 of the main body 210 and can be coaxial with the pivot axis 278. In the example provided, an end 290 of the pivot rod 258 extends through the pivot aperture 242 beyond the exterior 230 of the main body 210, and the first end 282 of the biasing member 218 is mounted to the exterior 230 of the main body 210. It is understood that the biasing member 218 can alternatively be located within the main body 210 and the pivot aperture 242 need not extend fully through the main body 210 to the exterior 230. The restricting plate 262 and tab 266 can be non-rotatably, or fixedly coupled to the pivot rod 258 for rotation therewith.

With specific reference to FIG. 3, the flow restrictor 70 is shown with the restricting element 214 in the first rotational position A. The flow of the coolant fluid is generally indicated by arrows 294. In the first position A the restricting plate 262 can extend from the pivot rod 258 toward the upstream end 222, substantially parallel to the central axis 254. In the example provided, the restricting plate 262 is generally semi-circular in shape, although any other suitable shape can be used, such as an elliptical, rectangular, or irregular shape, for example. In the example provided, the restricting plate 262 extends a length substantially equal to the radius of the flow path 234. However, the restricting plate 262 can be longer or shorter than the radius of the flow path 234.

The tab 266 can extend from the pivot rod 258 at an attack angle 298 relative to the restricting plate 262. The attack angle 298 can be greater than zero degrees and less than one hundred and eighty degrees, for example. The attack angle 298 can also be between 180° and 360° relative to the restricting plate 262. In the example provided, the tab 266 has a generally rectangular shape, although any other suitable shapes can be used, such as an elliptical, semi-circular, or irregular shape, for example.

In the example provided, the tab 266 is spaced apart from the sides 270, 274 of the flow path 234, such that the coolant fluid can flow around the sides of the tab 266, between the tab and the flow path 234. However, the tab 266 can alternatively extend the entire width of the flow path 234, from side 270 to side 274. The tab 266 can have a significantly smaller surface area than the restricting plate 262, such that in the first position A, the coolant fluid is free to flow through the flow path 234 with little restriction, and the flow is only restricted by the width of the pivot rod 258 and the relatively small surface area of the tab 266.

The biasing member 218 provides an opening torque 302 on the pivot rod 258 to bias the restricting element 214 toward the first rotational position A. The dynamic fluid pressures of the coolant fluid acting on the tab 266 create a closing torque 306 on the pivot rod 258. When the flow of the coolant fluid is less than a predetermined flow rate, the closing torque 306 is insufficient to overcome the opening torque 302 of the biasing member 218. Thus, with the exception of minor fluctuations, or deviations, the restricting element 214 is held generally in the first position A when the coolant fluid flows through the flow path 234 at a flow rate less than the predetermined flow rate.

With specific reference to FIG. 4, the flow restrictor 70 is shown in a second rotational position B. In the second rotational position, the flow of the coolant fluid is generally indicated by arrows 310. When the flow rate of the coolant fluid exceeds the predetermined flow rate, the closing torque 306 overcomes the opening torque 302 provided by the biasing member 218. Once the closing torque 306 is greater than the opening torque 302, the pivot rod 258 begins to rotate about the pivot axis 278. Rotation of the pivot rod 258 causes rotation of the restricting plate 262 off of central axis 254 and into an intermediate position (not shown) between the first position A and the second position B which the restricting plate 262 is at an angle 314 relative to the central axis 254, and thus also relative to the flow 310 of the coolant fluid. When in the intermediate position, the angle 314 is greater than zero degrees and less than ninety degrees. As the angle 314 increases, the dynamic fluid pressure of the coolant fluid acting on the restricting plate 262 sharply increases, further increasing the closing torque 306, and causing the pivot rod 258 to rotate into the second rotational position B. As the pivot rod 258 rotates, and the angle 314 increases, the restricting plate 262 rotates into the flow path 234 to block, or restrict the flow 310 of the coolant fluid without fully blocking all of the flow 310 through the flow path 234. In the second rotational position B, the coolant fluid can be generally free to flow through the portion of the flow path 234 not blocked by the restricting plate 262. While the example provided shows the restricting plate 262 blocking half of the flow path 234, the restricting plate 262 can be configured to allow some flow through that half, such as through apertures (not shown) in the restricting plate 262, or where the restricting plate 262 has a radius less than the radius of the flow path 234, for example.

The stop element 238 can have a stop body 318 configured to engage the restricting element 214 when the restricting element 214 is in the second rotational position B to prevent the restricting element 214 from rotating further due to the closing torque 306. In the example provided, the stop body 318 is coupled to the main body 210 within the flow path 234, and extends from the main body 210, radially inward toward the central axis 254 to engage the restricting plate 262. The stop body 318 can alternatively, or additionally, be configured to engage the tab 266 or pivot rod 258 to prevent the closing torque 306 from rotating the restricting element 214 past the second rotational position B. It is understood that the stop body 318 can alternatively be coupled to the main body 210 in other locations, such as within the pivot aperture 242, or on the exterior 230 of the main body 210, to engage the pivot rod 258. Although the example illustrated shows angle 314 between the restricting plate 262 and the central axis 254 at the second rotational position B, as being ninety degrees, the stop element 238 can be positioned to stop rotation of the restricting element 214 such that the angle 314 is less than ninety degrees, in order to allow some flow around the restricting plate 262.

Figure 7:
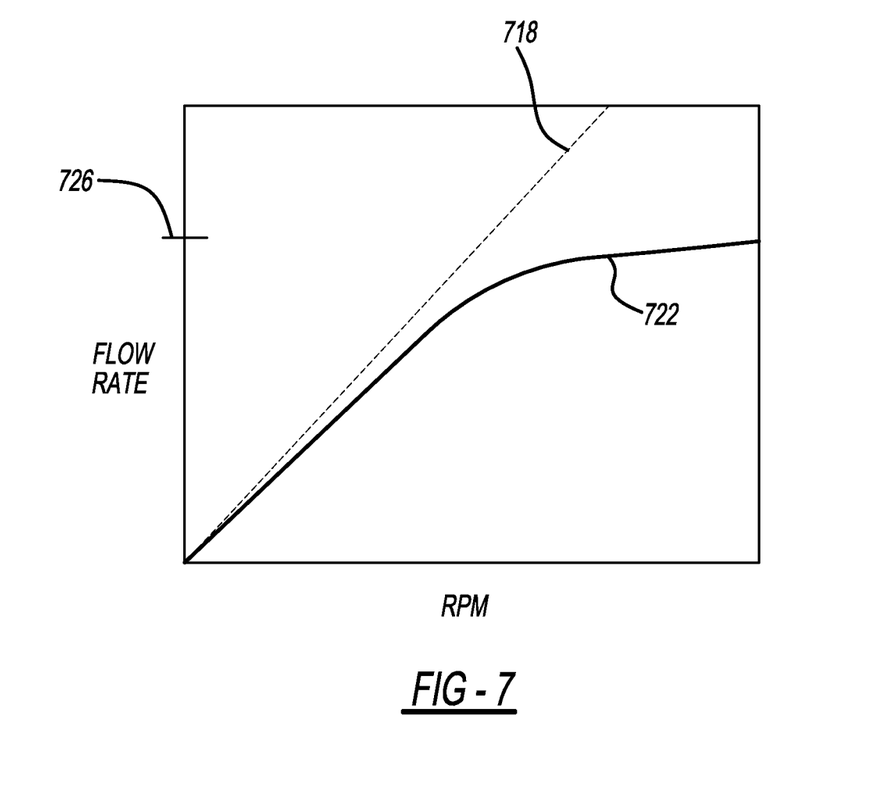
FIG. 7 is graph comparing flowrate through the flow restrictor of FIG. 1 to engine speed.

With additional reference to FIG. 7, the relationship between flowrate of the coolant fluid and engine speed (RPM) is shown. The flowrate in the coolant system 18 without the flow restrictor 70 in the coolant circuit 122 is generally indicated by dashed line 718. The flowrate 718 can generally be directly proportional to the engine speed, such that the flowrate increases steadily as engine speed increases. The flowrate of the coolant system 18 with the flow restrictor 70 is shown as solid line 722. The flowrate 722 can be generally proportional to the engine speed until a predetermined flowrate 726 is reached. Once the predetermined flowrate 726 is reached, the restricting element 214 of the flow restrictor 70 moves to the second rotational position, as discussed above, to limit the flowrate 722 to the predetermined flowrate 726. The predetermined flowrate 726 can be a flowrate such that erosion within certain components of the coolant circuit 122 is minimized, such as the tubes 82 of the heat exchanger 54 for example.

Figure 5:
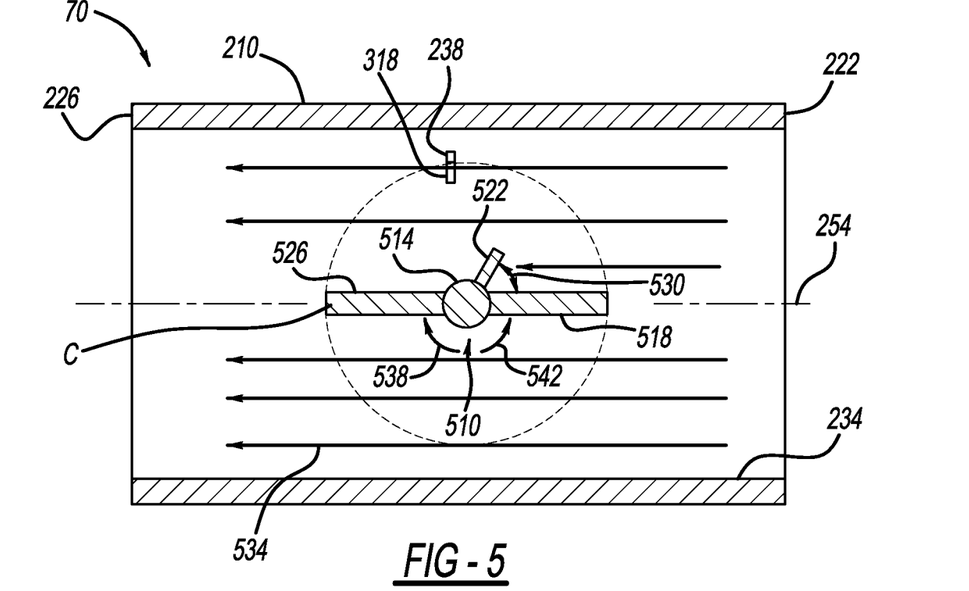
FIG. 5 is a section view of the flow restrictor of FIG. 1 having another configuration and in a first position in accordance with the present teachings.
Figure 6:
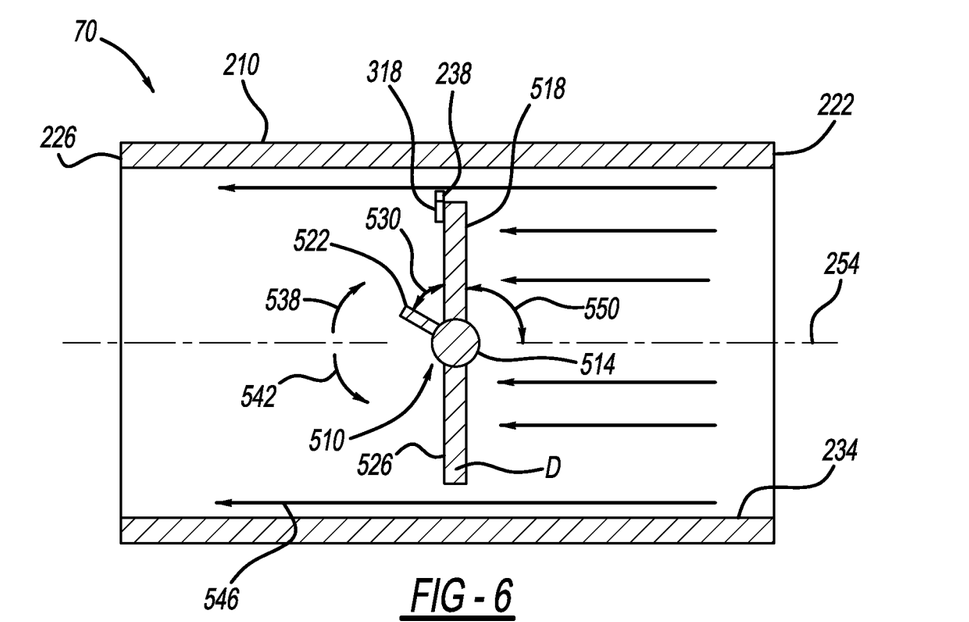
FIG. 6 is a section view of the flow restrictor of FIG. 5 in a second position.

With reference to FIGS. 5 and 6, the flow restrictor 70 is shown having a restricting element 510 of another configuration in a first rotational position C (FIG. 5) and a second rotational position D (FIG. 6). Restricting element 510 is similar to restricting element 214, and includes a pivot rod 514, a first restricting plate 518, and a tab 522, unlike the restricting element 214, the restricting element 510 can further include a second restricting plate 526. The tab 522 can extend from the pivot rod 514 at an attack angle 530 relative to the first restricting plate 518, similar to attack angle 298. The pivot rod 514, first restricting plate 518, and tab 522 can be substantially similar to pivot rod 258, restricting plate 262, and tab 266, and their descriptions are incorporated herein by reference.

The second restricting plate 526 can be non-rotatably coupled to the pivot rod 514 for rotation therewith. The second restricting plate 526 can extend from the pivot rod 514 at a straight angle, or 180°, relative to the first restricting plate 518. In the first position C, the second restricting plate 526 extends substantially parallel to the central axis 254 and toward the downstream end 226 of the main body 210. In the example provided, the first restricting plate 518 and the second restricting plate 526 are substantially similar in size and shape, although other configurations can be used. In the example provided, the first restricting plate 518 and second restricting plate 526 each have a semi-circular shape with a radial length less than the radius of the flow path 234, to allow flow around the first and second restricting plates 518, 526 when in the second position D. However, the first restricting plate 518 and second restricting plate 526 can alternatively have a radial length substantially equal to the radius of the flow path 234, while allowing flow through orifices (not shown) formed in the first and second restricting plates 518, 526, when in the second position D. The orifices can be designed to minimize or control turbulence downstream of the restricting plates 518, 526.

In the first position C, the flow of the coolant fluid is generally indicated by arrows 534. The coolant fluid is free to flow through the flow path 234 with little restriction, and the flow is only restricted by the width of the pivot rod 514 and the relatively small surface area of the tab 522. The biasing member 218 can be coupled to pivot rod 514 substantially similarly to pivot rod 258, to provide an opening torque 538 on the pivot rod 514 to bias the pivot rod 514 toward the first position. The dynamic fluid pressures acting on the tab 522 create a closing torque 542 on the pivot rod 514. When the flow of the coolant fluid is less than a predetermined flow rate, the closing torque 542 can be insufficient to overcome the opening torque 538 of the biasing member 218. Thus, with the exception of minor fluctuations, or deviations, the restricting element 510 is held generally in the first position C when the coolant fluid flows through the flow path 234 at a flow rate less than the predetermined flow rate.

In the second position D, the flow of the coolant fluid is generally indicated by arrows 546. When the flow rate of the coolant fluid exceeds the predetermined flow rate, the closing torque 542 is greater than the opening torque 538 provided by the biasing member 218. Once the closing torque 542 is greater than the opening torque 538, the pivot rod 514 begins to rotate. Rotation of the pivot rod 514 causes rotation of the first and second restriction plates 518, 526 off of central axis 254 into an intermediate position (not shown) where the first restricting plate 518 is at an angle 550 relative to the central axis 254, and thus relative to the flow 546 of the coolant fluid. When in the intermediate position, the angle 550 is greater than zero degrees and less than 90°.

As the angle 550 increases, the dynamic fluid pressure acting on the first restricting plate 518 sharply increases, further increasing the closing torque 542. The dynamic fluid pressure acting on the second restricting plate 526 causes the opening torque 538 to increase. Since the second restricting plate 526 trails in the direction of the fluid flow 546, and the first restricting plate 518 leads in the direction of the fluid flow 546, the velocity of the coolant fluid between the first restricting plate 518 and the flow path 234 is relatively lower than the velocity of the coolant fluid between the second restricting plate 526 and the flow path. Thus, the dynamic fluid pressure acting on the first restricting plate 518 is higher than the dynamic fluid pressure acting on the second restricting plate 526, which causes the closing torque 542 to increase greater than the opening torque 538, and the pivot rod 514 is rotated into the second rotational position.

In the second position D, the dynamic forces acting on the first and second restricting plates 518, 526 can balance with the opening torque 538 of the biasing member 218. The amount of the opening torque 538 created by the biasing member 218 can be relatively minor compared to the closing torque 542 created by the balancing dynamic fluid pressures of the fluid acting on the first restricting plate 518 and the second restricting plate 526 when the first and second restricting plates 518, 526 are in the second rotational position, or perpendicular to the flow path 234, resulting in a quick transition between the first rotational position C and the second rotational position D.

As the pivot rod 514 rotates and the angle 550 increases, the first and second restricting plates 518, 526 rotate into the flow path 234 to block or restrict the flow 546 of the coolant fluid, without fully blocking all of the flow 546 through the flow path 234. In the example provided, the restricting plates 518, 526 are illustrated in a vertical orientation, perpendicular to the central axis 254, due to the relatively small force of the biasing member 218 relative to the dynamic fluid pressures on the first and second restricting plates 518, 526. It is understood that the exact orientation will depend on the surface areas of the first and second restricting plates 518, 526 and the spring rate of the biasing member 218. For example, the first and second restricting plates 518, 526 may be balanced at a position where the angle 550 is less than 90° relative to the central axis 254. Such a position can be designed to reduce turbulence downstream of the restricting plates 518, 526. In the second rotational position, the coolant fluid can be generally free to flow through the portion of the flow path 234 not blocked by the first and second restricting plates 518, 526. While the example provided shows the first and second restricting plates 518, 526 blocking less than the full radius of the flow path 234, the first and second restricting plates 518, 526 can be configured to extend the full radius of the flow path 234 while allowing some flow through apertures (not shown) in either or both of the first and second restricting plates 518, 526.

The stop body 318 of the stop element 238 can engage the restricting element 510 when the restricting element 510 is in the second rotational position D to prevent the restricting element 510 from rotating further due to the closing torque 542, similarly to the restricting element 214. In the example provided, the stop body 318 is coupled to the main body 210, and extends radially inward towards the central axis 254 to engage the first restricting plate 518. The stop body 318 can also be configured to engage the pivot rod 514, tab 522, or second restricting plate 526 for example, as described above with respect to restricting element 214. The operation of the coolant system 18 with restricting element 214 and restricting element 510 can be substantially similar with regard to flowrates and engine speed, as that discussed above with regard to FIG. 7.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An internal combustion engine coolant system comprising:
    the internal combustion engine including an engine inlet and an engine outlet; a heat exchanger including a heat exchanger inlet and a heat exchanger outlet, the engine outlet is connected to the heat exchanger inlet by a supply line, and the engine inlet is connected to the heat exchanger outlet through a return conduit;
    a coolant pump having a coolant pump flow rate that is directly proportional to an engine speed of the internal combustion engine;
    a restrictor element of a flow restrictor configured for rotation about a pivot axis within a flow path of a coolant line including the supply line, said restrictor element including:
        a first restrictor plate extending in a first direction; and
        a tab extending in a second direction different than said first direction; and a biasing member of the flow restrictor configured to generate a first torque about said pivot axis to bias said restrictor element towards a first rotational position in which said first restrictor plate extends substantially parallel to a central axis of said flow path;
    wherein:
        a second torque about said pivot axis is generated when a fluid flows through said flow path and contacts said tab;
        said second torque is opposite to said first torque and exceeds said first torque to rotate said restrictor element to a second rotational position when said fluid flows through said flow path at a flowrate greater than a first predetermined flowrate when the engine speed of the internal combustion engine is increased;
        said first restrictor plate is configured to block a portion of said flow path to limit said fluid to a second predetermined flowrate that is less than the first predetermined flowrate; and
        the fluid flows through the flow path in response to increase in engine speed and rotates the restriction element such that the first restriction plate blocks a portion of the flow path to reduce fluid flow through the flow path as engine speed increases.

2. The system of claim 1, wherein said tab is smaller than said first restrictor plate and is coupled to said first restrictor plate at an angle of no greater than 90° relative to said first restrictor plate.

3. The system of claim 1, further comprising a main body and a pivot rod, said main body defining a pivot aperture, wherein said first restrictor plate and said tab are non-rotatably coupled to said pivot rod and said pivot rod is rotatably received in said pivot aperture.

4. The system of claim 3, wherein said pivot aperture extends through said main body and said pivot rod extends through said pivot aperture to an exterior of said main body.

5. The system of claim 1, wherein said first restrictor plate extends in an upstream direction when in said first rotational direction.

6. The system of claim 1, wherein said biasing member is a torsion spring.

7. The system of claim 1, wherein said first restrictor plate is a semi-circular disc.

8. The system of claim 1, wherein said restrictor element is coupled inline to a thermostat.

9. A coolant system for an internal combustion engine, the coolant system comprising:
  the internal combustion engine including an engine inlet and an engine outlet;
  a heat exchanger including a heat exchanger inlet and a heat exchanger outlet, the engine outlet is connected to the heat exchanger inlet by a supply line, and the engine inlet is connected to the heat exchanger outlet through a return conduit;
  a coolant pump having a coolant pump flow rate that is directly proportional to an engine speed of the internal combustion engine;
  a coolant conduit defining a flow passageway configured to circulate a coolant fluid through said coolant conduit, the coolant conduit including the supply line and the return conduit;
  a flow restrictor disposed within said flow passageway and including:
    a pivot member rotatably coupled to said coolant conduit and configured to rotate about a pivot axis;
    a first restrictor plate fixedly coupled to said pivot member and extending radially therefrom; and
    a tab fixedly coupled to said pivot member and extending radially therefrom at an angle relative to said first restrictor plate; and
    a biasing member configured to bias said pivot member toward a first rotational position;
  wherein:
    a torque about said pivot axis is generated when said coolant fluid flows through said flow passageway and contacts said tab, when said coolant fluid flows through said flow passageway at a flowrate greater than a predetermined flowrate when the engine speed is increased said torque overcomes said biasing member to rotate said pivot member to a second rotational position;
    in said first rotational position, a first area of said flow passageway is restricted by said tab, and in said second rotational position a second area of said flow passageway is restricted by said restrictor plate, said second area being greater than said first area; and
    the fluid flows through the flow passageway in response to increase in engine speed and rotates the flow restrictor such that the first restrictor plate blocks a portion of the flow passageway to reduce fluid flow through the flow passageway as engine speed increases.

10. The coolant system of claim 9, wherein said coolant conduit defines a pivot aperture, said pivot member extending through said pivot aperture to an exterior of said coolant conduit.

11. The coolant system of claim 9, wherein said first restrictor plate extends in an upstream direction and substantially parallel to a central axis of said flow passageway when said pivot member is in said first rotational position.

12. The coolant system of claim 9, further comprising a heat exchanger having an inlet and an outlet, said flow restrictor being mounted to one of said inlet and said outlet.

13. The coolant system of claim 9, wherein said coolant conduit further includes a thermostat.

14. The coolant system of claim 13, wherein said pivot member being rotatably coupled to said thermostat.

15. A coolant system for an internal combustion engine, the coolant system comprising:
  the internal combustion engine including an engine inlet and an engine outlet; a heat exchanger including an inlet port and an outlet port; a coolant circuit including:
  a coolant pump having a coolant pump flow rate that is directly proportional to an engine speed of the internal combustion engine;
  a supply conduit coupled for fluid communication with said inlet port and the engine outlet, and defining a supply passageway configured to convey coolant fluid from the internal combustion engine to said heat exchanger; and
  a return conduit coupled for fluid communication with said outlet port and the engine inlet, and defining a return passageway configured to convey said coolant fluid from said heat exchanger to the internal combustion engine;
  a flow restrictor disposed within one of said supply passageway or said return passageway, said flow restrictor including:
    a pivot member rotatably coupled to one of said supply conduit or said return conduit that said flow restrictor is disposed within and configured to rotate about a pivot axis;
    a first restrictor plate fixedly coupled to said pivot member and extending radially therefrom in a first direction; and
    a tab fixedly coupled to said pivot member and extending radially therefrom in a second direction different than said first direction; and
    a biasing member configured to bias said pivot member toward a first rotational position in which said first restrictor plate is substantially parallel to a central axis of said one of said supply passageway or said return passageway;
  wherein:
    a torque about said pivot axis is generated when a fluid flows through said one of said supply passageway or said return passageway and contacts said tab, when said coolant fluid flows through said coolant circuit at a flowrate greater than a predetermined flowrate when the speed of the internal combustion engine is increased said torque overcomes said biasing member to rotate said pivot member to a second rotational position;
    in said first rotational position, a first area of said one of said supply passageway and said return passageway is restricted by said tab, and in said second rotational position a second area of said one of said supply passageway and said return passageway is restricted by said restrictor plate, said second area being greater than said first area; and
    the fluid flows through the supply passageway in response to an increase in engine speed and rotates the flow restrictor such that the first restrictor plate blocks a portion of the supply passageway to reduce fluid flow through the supply passageway as engine speed increases.

16. The coolant system of claim 15, further comprising a thermostat, said thermostat configured to allow said coolant fluid to flow through said coolant circuit when a temperature of said coolant fluid is greater than or equal to a predetermined temperature, and to prevent said coolant fluid from flowing through said coolant circuit when said temperature of said coolant fluid is less than said predetermined temperature.

17. The coolant system of claim 15, wherein said first restrictor plate extends from said pivot member radially outward toward an upstream end of said one of said supply passageway or said return passageway when said pivot member is in said first rotational position.

* * * * *

UNITED STATES PATENT AND TRADEMARK OFFICE
CERTIFICATE OF CORRECTION

PATENT NO. : 10,059,191 B2
APPLICATION NO. : 14/321207
DATED : August 28, 2018
INVENTOR(S) : Jacob Wright Page 1 of 1

It is certified that error appears in the above-identified patent and that said Letters Patent is hereby corrected as shown below:

In the Claims

Column 12, Claim 1, Line 21, after "outlet;", insert --¶--

Column 12, Claim 1, Line 35, after "and", insert --¶--

Column 14, Claim 15, Line 13, after "outlet;" insert --¶--

Column 14, Claim 15, Line 14, after "port;", insert --¶--

Signed and Sealed this
Twenty-fifth Day of June, 2019

Andrei Iancu
*Director of the United States Patent and Trademark Office*